(12) United States Patent
Chen

(10) Patent No.: US 11,086,162 B1
(45) Date of Patent: Aug. 10, 2021

(54) DISPLAY PANEL AND DISPLAY DEVICE

(71) Applicant: TCL CHINA STAR OPTOELECTRONICS TECHNOLOGY CO., LTD, Guangdong (CN)

(72) Inventor: Xingwu Chen, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/968,614

(22) PCT Filed: May 21, 2020

(86) PCT No.: PCT/CN2020/091483
§ 371 (c)(1),
(2) Date: Aug. 10, 2020

(30) Foreign Application Priority Data

Apr. 26, 2020 (CN) .......................... 202010338398.5

(51) Int. Cl.
*G02F 1/1335* (2006.01)
*G02F 1/1343* (2006.01)

(52) U.S. Cl.
CPC .. *G02F 1/133528* (2013.01); *G02F 1/133514* (2013.01); *G02F 1/134309* (2013.01)

(58) Field of Classification Search
None
See application file for complete search history.

(56) References Cited

U.S. PATENT DOCUMENTS

| | | | | | |
|---|---|---|---|---|---|
| 4,634,229 | A | * | 1/1987 | Amstutz | G02F 1/1397 349/101 |
| 5,602,662 | A | * | 2/1997 | Rosenblatt | G02F 1/1393 349/130 |
| 5,710,609 | A | * | 1/1998 | Shimada | G02F 1/1393 349/126 |
| 6,072,558 | A | * | 6/2000 | Tanaka | G02F 1/1391 349/179 |
| 6,774,966 | B1 | * | 8/2004 | Yakovenko | G02F 1/133707 349/129 |
| 8,502,943 | B2 | * | 8/2013 | Fan | G02F 1/133707 349/129 |

(Continued)

FOREIGN PATENT DOCUMENTS

| | | |
|---|---|---|
| CN | 101881903 A | 11/2010 |
| CN | 103323984 A | 9/2013 |

(Continued)

*Primary Examiner* — Ryan Crockett
(74) *Attorney, Agent, or Firm* — Mark M. Friedman

(57) ABSTRACT

A display panel and a display device are provided in an embodiment of the present disclosure. The display panel includes a first substrate and a second substrate that are disposed opposite each other. A liquid crystal layer is disposed between the first substrate and the second substrate and the liquid crystal layer is doped with a chiral agent. In the present disclosure, the liquid crystal layer of the display panel is doped with a chiral agent and a helical twisting force generated by the chiral agent is used to drive liquid crystal molecules around a pixel to rotate, which can reduce a dark region around the pixel and increase transmittance of the display panel.

10 Claims, 5 Drawing Sheets

(56) References Cited

U.S. PATENT DOCUMENTS

| | | | | |
|---|---|---|---|---|
| 2013/0141675 A1* | 6/2013 | Hsieh | ............... | G02F 1/1393 |
| | | | | 349/96 |
| 2013/0141676 A1* | 6/2013 | Hsieh | ............... | G02F 1/1395 |
| | | | | 349/96 |
| 2016/0085102 A1* | 3/2016 | Ohmuro | ............ | G02B 5/305 |
| | | | | 349/61 |
| 2021/0165288 A1* | 6/2021 | Chen | ............ | G02F 1/134309 |

FOREIGN PATENT DOCUMENTS

| | | | |
|---|---|---|---|
| CN | 110824789 A | * | 2/2020 |
| CN | 110928072 A | | 3/2020 |

* cited by examiner

DISPLAY PANEL AND DISPLAY DEVICE

CROSS REFERENCE TO RELATED APPLICATIONS

The present disclosure claims the priority of the China Patent Application filed on Apr. 26, 2020 with the application number 202010338398.5 and titled "DISPLAY PANEL AND DISPLAY DEVICE". The disclosures of which are incorporated herein by reference in their entirety.

FIELD OF INVENTION

The present disclosure relates to the field of display technology, and more particularly to a display panel and a display device.

BACKGROUND OF INVENTION

Polymer stabilized vertically alignment (PSVA) which is known as polymer stabilized vertical aligned liquid crystal in Chinese, is a new liquid crystal display technology. PSVA technology possesses the following advantages: (1) high contrast ratios: static contrast ratios may reach 16000:1; (2) wide viewing angles: large viewing angles have low color shifts less than 0.02, which meets the needs of multiperson viewing; (3) fast response times: dynamic image response times are less than 5 ms; (4) low power consumption: high transmittance (greater than 30%) can provide energy-efficient backlight modules; and (5) suitability for development of every generation of factories, which has been verified in manufacturing lines of 8.5 generations.

Ultraviolet irradiation processes are required to add in manufacturing processes of display panels for PSVA display modes. That is, ultraviolet light irradiation is performed under voltage, so that the liquid crystal molecules inclined in a certain direction are irradiated by ultraviolet light to polymerize the polymerizable monomer in the liquid crystal, thereby forming a certain pre-tilt angle. However, this way of the current pixel design scheme inevitably results in a certain region around pixels having an undesired condition, i.e., a dark region.

That is, a large area of a dark region exists around the pixels of the display panel in the prior art, which reduces transmittance of the display panel.

SUMMARY OF INVENTION

Technical Problems

Embodiments of the present disclosure provide a display panel and a display device, which can reduce dark regions around pixels and increase the transmittance of the display panel.

To solve the above problem, a first aspect of the present disclosure provides a display panel, comprising a first substrate and a second substrate disposed opposite each other, a liquid crystal layer disposed between the first substrate and the second substrate, wherein the liquid crystal layer is doped with a chiral agent, a pitch of the liquid crystal layer is 8 μm to 60 μm, and a product of the birefringence of the liquid crystal layer and a thickness of the liquid crystal layer is 300 nm to 550 nm.

The first substrate is an array substrate, the second substrate is a color filter substrate, a first polarizer is disposed on a side of the first substrate away from the liquid crystal layer, a pixel electrode layer is disposed on a side of the first substrate close to the liquid crystal layer, a second polarizer is disposed on a side of the second substrate away from the liquid crystal layer, a polarization direction of the first polarizer is perpendicular to a polarization direction of the second polarizer, and the pixel electrode layer comprises a plurality of pixel electrodes.

In order to solve the above problem, a second aspect of the present disclosure provides a display panel, comprising a first substrate and a second substrate disposed opposite each other, a liquid crystal layer is disposed between the first substrate and the second substrate, and the liquid crystal layer is doped with a chiral agent.

A pitch of the liquid crystal layer is 8 μm to 60 μm.

A product of the birefringence of the liquid crystal layer and a thickness of the liquid crystal layer is 300 nm to 550 nm.

The first substrate is an array substrate, the second substrate is a color filter substrate, a first polarizer is disposed on a side of the first substrate away from the liquid crystal layer, a pixel electrode layer is disposed on a side of the first substrate close to the liquid crystal layer, a second polarizer is disposed on a side of the second substrate away from the liquid crystal layer, a polarization direction of the first polarizer is perpendicular to a polarization direction of the second polarizer, and the pixel electrode layer comprises a plurality of pixel electrodes.

The pixel electrode comprises a first main electrode, a second main electrode, a third main electrode, and a fourth main electrode connected at one end, the first main electrode, the second main electrode, the third main electrode, and the fourth main electrode are sequentially arranged clockwise on the first substrate, two adjacent main electrodes are perpendicular to each other, a plurality of first sub-electrodes are provided between the first main electrode and the second main electrode, a plurality of second sub-electrodes are provided between the second main electrode and the third main electrode, a plurality of third sub-electrodes are provided between the third main electrode and the fourth main electrode, and a plurality of fourth sub-electrodes are provided between the fourth main electrode and the first main electrode.

The chiral agent is a levorotatory chiral agent, wherein at a viewing angle that the second substrate is facing toward the first substrate, after the pixel electrode is rotated counterclockwise into a first preset angle, the first main electrode is parallel to the polarization direction of the second polarizer, and a relationship between the first preset angle and the pitch of the liquid crystal layer satisfies any one of a first condition, a second condition, a third condition, a fourth condition, or a fifth condition, wherein the first condition is: the pitch of the liquid crystal layer is not greater than 11 μm and the first preset angle is 30 degrees to 50 degrees;

the second condition is: the pitch of the liquid crystal layer is 11 μm to 13.5 μm and the first preset angle is 40 degrees to 60 degrees;

the third condition is: the pitch of the liquid crystal layer is 13.5 μm to 16 μm and the first preset angle is 45 degrees to 65 degrees;

the fourth condition is: the pitch of the liquid crystal layer is 16 μm to 18.5 μm and the first preset angle is 50 degrees to 70 degrees; and the fifth condition is: the pitch of the liquid crystal layer is not less than 18.5 μm and the first preset angle is 55 degrees to 75 degrees.

An angle between the first sub-electrodes and the first main electrode is 45 degrees, and/or an angle between the second sub-electrodes and the second main electrode is 45 degrees, and/or an angle between the third sub-electrodes and the third main electrode is 45 degrees, and/or an angle between the fourth sub-electrodes and the fourth main electrode is 45 degrees.

the chiral agent is a levorotatory chiral agent, the first main electrode is parallel to the polarization direction of the second polarizer, an angle between the fourth sub-electrodes and the first main electrode is a second preset angle, an angle between the first sub-electrodes and the first main electrode is a third preset angle, a relationship between the second preset angle, the third preset angle, and the pitch of the liquid crystal layer satisfies any one of a sixth condition, a seventh condition, a eighth condition, and a ninth condition, wherein the sixth condition is: the pitch of the liquid crystal layer is not greater than 13.5 µm, the second preset angle is 75 degrees to 90 degrees, and the third preset angle is 0 degrees to 15 degrees;

the seventh condition is: the pitch of the liquid crystal layer is 13.5 µm to 16 µm, the second preset angle is 70 degrees to 90 degrees, and the third preset angle is 0 degrees to 20 degrees;

the eighth condition is: the pitch of the liquid crystal layer is 16 µm to 18.5 µm, the second preset angle is 65 degrees to 90 degrees, and the third preset angle is 5 degrees to 25 degrees; and the ninth condition is: the pitch of the liquid crystal layer is not less than 18.5 µm, the second preset angle is 60 degrees to 90 degrees, and the third preset angle is 10 degrees to 30 degrees.

The first sub-electrodes are parallel to the third sub-electrodes and the second sub-electrodes are parallel to the fourth sub-electrodes.

In order to solve the above problem, a third aspect of the present disclosure provides a display device, wherein the display device comprises a display panel, the display panel comprises a first substrate and a second substrate disposed opposite each other, a liquid crystal layer is disposed between the first substrate and the second substrate, and the liquid crystal layer is doped with a chiral agent.

A pitch of the liquid crystal layer is 8 µm to 60 µm.

A product of the birefringence of the liquid crystal layer and a thickness of the liquid crystal layer is 300 nm to 550 nm.

The first substrate is an array substrate, the second substrate is a color filter substrate, a first polarizer is disposed on a side of the first substrate away from the liquid crystal layer, a pixel electrode layer is disposed on a side of the first substrate close to the liquid crystal layer, a second polarizer is disposed on a side of the second substrate away from the liquid crystal layer, a polarization direction of the first polarizer is perpendicular to a polarization direction of the second polarizer, and the pixel electrode layer comprises a plurality of pixel electrodes.

The pixel electrode comprises a first main electrode, a second main electrode, a third main electrode, and a fourth main electrode connected at one end, the first main electrode, the second main electrode, the third main electrode, and the fourth main electrode are sequentially arranged clockwise on the first substrate, two adjacent main electrodes are perpendicular to each other, a plurality of first sub-electrodes are provided between the first main electrode and the second main electrode, a plurality of second sub-electrodes are provided between the second main electrode and the third main electrode, a plurality of third sub-electrodes are provided between the third main electrode and the fourth main electrode, and a plurality of fourth sub-electrodes are provided between the fourth main electrode and the first main electrode.

The chiral agent is a levorotatory chiral agent, wherein at a viewing angle that the second substrate is facing toward the first substrate, after the pixel electrode is rotated counterclockwise into a first preset angle, the polarization directions of the first main electrode is parallel to the second polarizer, and a relationship between the first preset angle and the pitch of the liquid crystal layer satisfies any one of a first condition, a second condition, a third condition, a fourth condition, or a fifth condition, wherein the first condition is: the pitch of the liquid crystal layer is not greater than 11 µm and the first preset angle is 30 degrees to 50 degrees;

the second condition is: the pitch of the liquid crystal layer is 11 µm to 13.5 µm and the first preset angle is 40 degrees to 60 degrees;

the third condition is: the pitch of the liquid crystal layer is 13.5 µm to 16 µm and the first preset angle is 45 degrees to 65 degrees;

the fourth condition is: the pitch of the liquid crystal layer is 16 µm to 18.5 µm and the first preset angle is 50 degrees to 70 degrees; and the fifth condition is: the pitch of the liquid crystal layer is not less than 18.5 µm and the first preset angle is 55 degrees to 75 degrees.

An angle between the first sub-electrodes and the first main electrode is 45 degrees, and/or an angle between the second sub-electrodes and the second main electrode is 45 degrees, and/or an angle between the third sub-electrodes and the third main electrode is 45 degrees, and/or an angle between the fourth sub-electrodes and the fourth main electrode is 45 degrees.

The chiral agent is a levorotatory chiral agent, the first main electrode is parallel to the polarization direction of the second polarizer, an angle between the fourth sub-electrodes and the first main electrode is a second preset angle, an angle between the first sub-electrodes and the first main electrode is a third preset angle, a relationship between the second preset angle, the third preset angle, and a pitch of the liquid crystal layer satisfies any one of the sixth condition, the seventh condition, the eighth condition, and the ninth condition, wherein the sixth condition is: the pitch of the liquid crystal layer is not greater than 13.5 µm, the second preset angle is 75 degrees to 90 degrees, and the third preset angle is 0 degrees to 15 degrees;

the seventh condition is: the pitch of the liquid crystal layer is 13.5 µm to 16 µm, the second preset angle is 70 degrees to 90 degrees, and the third preset angle is 0 degrees to 20 degrees;

the eighth condition is: the pitch of the liquid crystal layer is 16 µm to 18.5 µm, the second preset angle is 65 degrees to 90 degrees, and the third preset angle is 5 degrees to 25 degrees; and the ninth condition is: the pitch of the liquid crystal layer is not less than 18.5 µm, the second preset angle is 60 degrees to 90 degrees, and the third preset angle is 10 degrees to 30 degrees.

The first sub-electrodes are parallel to the third sub-electrodes and the second sub-electrodes are parallel to the fourth sub-electrodes.

Beneficial Effects

Compared with the prior art, the present disclosure provides a display panel including a first substrate and a second substrate that are oppositely arranged. A liquid crystal layer is disposed between the first substrate and the second substrate. The liquid crystal layer is doped with a chiral agent. In the present disclosure, the liquid crystal layer of the display panel is doped with a chiral agent. A helical twisting force generated by the chiral agent is used to drive the liquid crystal molecules around pixels to rotate, which can reduce a dark region around the pixel and increase the transmittance of the display panel.

DESCRIPTION OF DRAWINGS

In order to illustrate technical solutions in the embodiments of the present disclosure or in the prior art more clearly, the accompanying drawings required in the embodiments are introduced briefly hereafter. Obviously, the accompanying drawings in the following description are merely part of the embodiments of the present disclosure. Based upon the accompanying drawings, people with ordinary skills in the art can obtain other drawings without making inventive efforts.

DETAILED DESCRIPTION OF PREFERRED EMBODIMENTS

Figure 1:
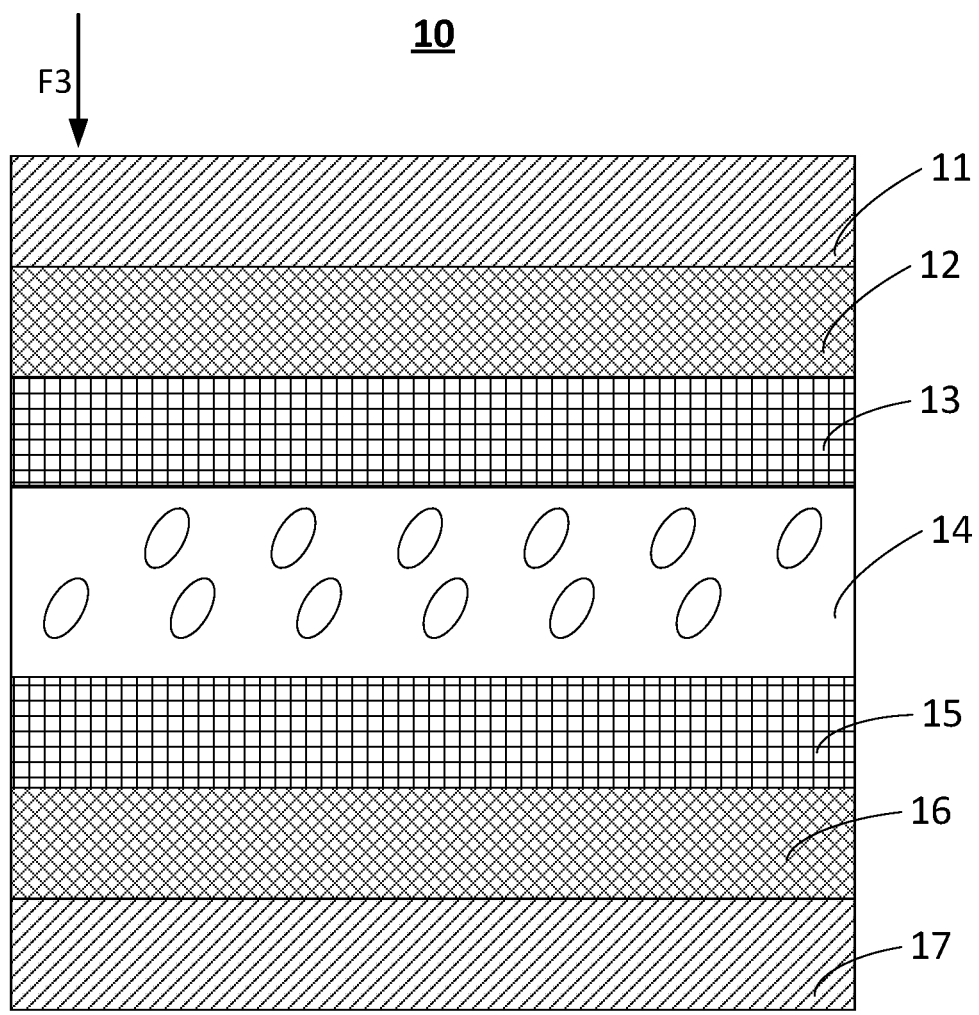
FIG. 1 is a schematic structural view of an embodiment of a display panel provided by an embodiment of the present disclosure.

The technical solutions of the embodiments of the present disclosure will be illustrated completely and clearly in combination with the following drawings of the embodiments of the disclosure. Apparently, the described embodiments are merely a few rather than all of the embodiments of the present disclosure. All other embodiments obtained by persons of ordinary skill in the art based on the embodiment of the present disclosure without creative efforts shall fall within the protection scope of the present disclosure.

In the description of the present disclosure, it should be understood that orientation or positional relationships indicated by the terms "center", "longitudinal", "transverse", "length", "width", "thickness", "upper", "lower", "front", "back", "left", "right", "vertical", "horizontal", "top", "bottom", "inner", "outer" are based on orientations or positional relationships shown in the drawings, which are merely for convenience of describing the present disclosure and simplifying the description, rather than indicating or implying that the device or element must be in the specific orientation, constructed and operated in the specific orientation. Therefore, they shell not be construed as a limitation of the application. In addition, the terms "first" and "second" are used for description purposes only, and cannot be understood as indicating or implying relative importance or implicitly indicating a number of technical features indicated. Thus, the features defined as "first" and "second" may explicitly or implicitly include one or more features. In the description of the present disclosure, the meaning of "a plurality of" is two or more than two, unless otherwise specifically limited.

In the present disclosure, the word "exemplary" is used herein to mean "serving as an example, instance or illustration". Any embodiment described as "exemplary" is not necessarily to be construed as preferred or advantageous over other embodiments. In order to enable any person skilled in the art to implement and use this disclosure, the following description is given. In the following description, details are listed for explanatory purposes. It should be understood that people skilled in the art may recognize that the present disclosure can be implemented without using these specific details. In other examples, well-known structures and processes will not be elaborated in detail in order to avoid unnecessary details that obscure the description of the present disclosure. Therefore, the present disclosure is not intended to be limited to the illustrated embodiments, but is consistent with the widest scope of the principles and features disclosed in the present disclosure.

An embodiment of the present disclosure provides a display panel including a first substrate and a second substrate disposed opposite each other. A liquid crystal layer is disposed between the first substrate and the second substrate. The liquid crystal layer is doped with a chiral agent. In the present disclosure, the liquid crystal layer of the display panel is doped with a chiral agent and a helical twisting force generated by the chiral agent is used to drive liquid crystal molecules around a pixel to rotate, which can reduce the dark region around the pixel and increase transmittance of the display panel. The details are described below.

Figure 2:
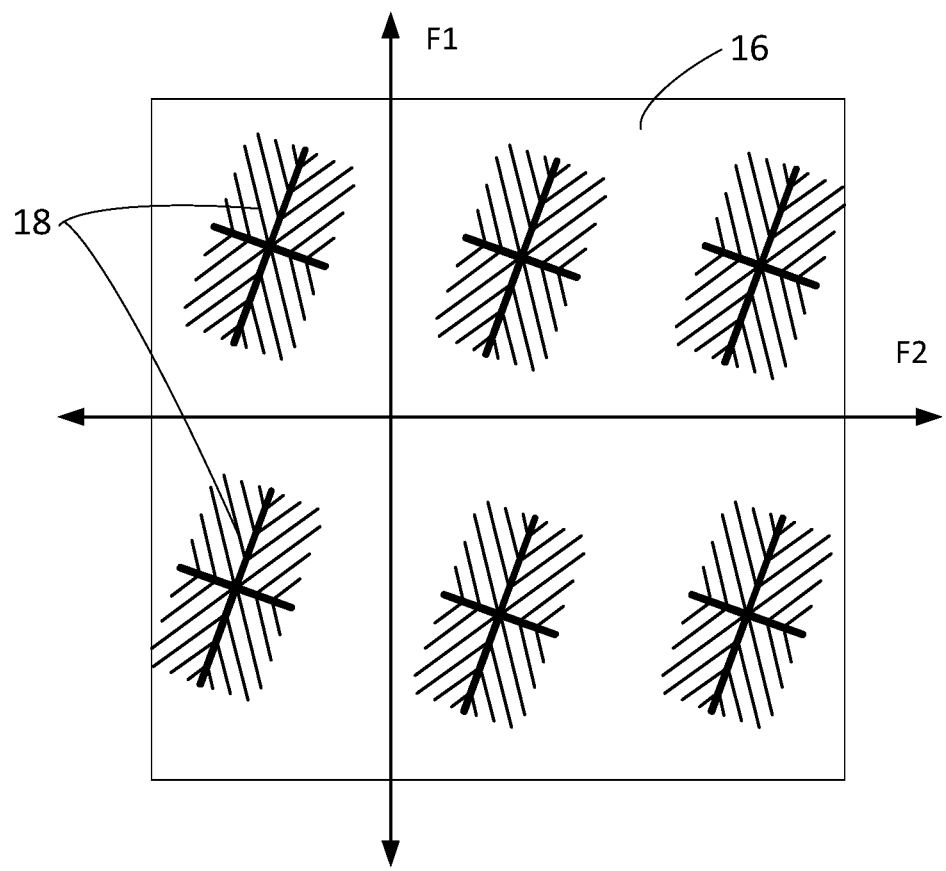
FIG. 2 is a schematic view of an arrangement of a pixel electrode in a specific embodiment of the display panel of FIG. 1 at a viewing angle F3 that the second substrate is facing toward the first substrate.
Figure 3:
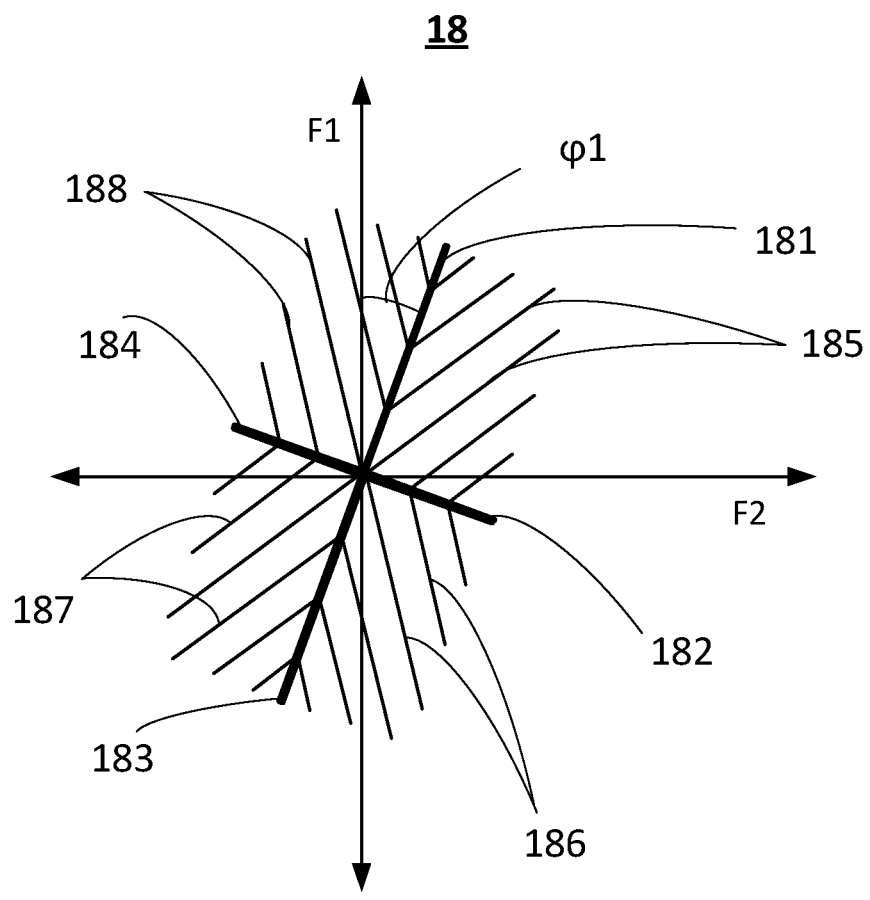
FIG. 3 is a schematic structural view of a pixel electrode in a specific embodiment of the display panel of FIG. 1 at a viewing angle F3 that the second substrate is facing toward the first substrate.

Referring to FIG. 1, FIG. 1 is a schematic structural view of an embodiment of a display panel provided by an embodiment of the present disclosure. FIG. 2 is a schematic view of an arrangement of a pixel electrode in a specific embodiment of the display panel of FIG. 1 at a viewing direction angle F3 from the second substrate to the first substrate. FIG. 3 is a schematic structural view of a pixel electrode in a specific embodiment of the display panel of FIG. 1 at a viewing direction F3 from the second substrate to the first substrate.

Referring to FIGS. 1-3, in the present embodiment, the display panel 10 includes a first substrate 16 and a second substrate 12 disposed opposite each other. A liquid crystal layer 14 is disposed between the first substrate 16 and the second substrate 12. The liquid crystal layer 14 is doped with a chiral agent. The liquid crystals of the liquid crystal layer 14 may be cholesteric liquid crystals. Cholesteric phase liquid crystals are named because they are first observed in liquid crystals of cholesteric esters and halides. In this type of liquid crystals, the elongated molecules are flat and equally arranged in layers by relying on interactions of the end groups. However, their long axes are on a plane of the layer. The molecules within the layer are similar to the nematic type. Orientations of the long axes of the molecules between two adjacent layers twist by a certain angle in sequence and are accumulated to form a spiral surface structure, due to an action of the optically active groups that extend out of the plane of the layer. A distance, by which the orientation direction of the liquid crystal molecules of the liquid crystal layer 14 undergoes a 360-degree change, is called a pitch P of the liquid crystal layer 14. After the chiral agent is added to the liquid crystal layer 14, the pitch P of the liquid crystal layer 14 can be changed. By adding a chiral agent to the liquid crystal layer 14, a helical twisting force generated by the chiral agent can be used to drive the liquid crystal molecules around a pixel to rotate, which effectively reduces a width of a dark region around the pixel.

In a preferred embodiment, the pitch P of the liquid crystal layer 14 ranges from 8 µm to 60 µm. Specifically, the pitch P of the liquid crystal layer 14 can be adjusted from 8 µm to 60 µm by adjusting a concentration of the chiral agent. It can further reduce the dark region around the pixel electrode and improve transmittance.

Furthermore, a product of a birefringence of the liquid crystal layer 14 and a thickness of the liquid crystal layer 14 ranges from 300 nm to 550 nm, which can improve the transmittance per unit area. The thickness d of the liquid crystal layer 14 is between 2.5 µm to 4 µm.

Furthermore, the liquid crystal molecules of the liquid crystal layer 14 are negative liquid crystal molecules. Negative liquid crystal molecules refer to a type of liquid crystal molecules whose dielectric constant in the long axis direction of the liquid crystal molecules is smaller than a node constant in the short axis direction of the molecules. The negative liquid crystals are aligned perpendicularly to a direction of an electric field in the electric field. The transmittance of the display panel 10 can be further increased using the negative liquid crystal molecules.

In an embodiment of the present disclosure, the first substrate 16 is an array substrate. The second substrate 12 is a color filter substrate. A first polarizer 17 is disposed on a side of the first substrate 16 away from the liquid crystal layer 14. A pixel electrode layer 15 is disposed on a side of the first substrate 16 close to the liquid crystal layer 14. A second polarizer 11 is disposed on a side of the second substrate 12 away from the liquid crystal layer 14. A polarization direction F2 of the first polarizer 17 is perpendicular to a polarization direction F1 of the second polarizer 11. The pixel electrode layer 15 includes a plurality of pixel electrodes 18. A common electrode layer 13A is disposed on a side of the second substrate 12 close to the liquid crystal layer 14.

It is noted that the display panel 10 may further include a red color filter layer, a green color filter layer, and a blue color filter layer for implementing color display, a black matrix layer for preventing light leakage, a support column for maintaining cell thickness. The first substrate 16 may be a flexible substrate or a common substrate, and the second substrate 12 may be a flexible substrate or a common ordinary substrate.

In a specific embodiment, a plurality of pixel electrodes 18 are arranged in an array on the first substrate 16. The pixel electrode 18 includes a first main electrode 181, a second main electrode 182, a third main electrode 183, and a fourth main electrode 184 connected at one end. The first main electrode 181, the second main electrode 182, the third main electrode 183, and the four main electrodes 184 are arranged clockwise on the first substrate 16. The two adjacent main electrodes are perpendicular to each other. A plurality of first sub-electrodes 185 are provided between the first main electrode 181 and the second main electrode 182. A plurality of second sub-electrodes 186 are provided between the second main electrode 182 and the third main electrode 183. A plurality of third sub-electrodes 187 are provided between the third main electrode 183 and the fourth main electrode 184. A plurality of fourth sub-electrodes 188 are provided between the fourth main electrode 184 and the first main electrode 181. An end of the first sub-electrode 185 is connected to the first main electrode 181 or the second main electrode 182. An end of the second sub-electrode 186 is connected to the second main electrode 182 or the third main electrode 183. An end of the third sub-electrode 187 is connected to the third main electrode 183 or the fourth main electrode 184. An end of the fourth sub-electrode 188 are connected to the first main electrode 181 or the fourth main electrode 184. A plurality of first sub-electrodes 185 are equally spaced from each other. A plurality of second sub-electrodes 186 are equally spaced from each other. A plurality of third sub-electrodes 187 are equally spaced from each other. A plurality of fourth sub-electrodes 188 are equally spaced from each other.

Specifically, the chiral agent of the liquid crystal layer 14 is a levorotatory chiral agent. Chiral agents can be divided into levorotatory chiral agents and right-handed chiral agents. According to different directions of light induced rotation of chiral molecules, levorotatory chiral agents rotate clockwise and right-handed Chiral agents rotate counterclockwise.

At a viewing direction from the second substrate 12 to the first substrate 16, i.e., viewing from a direction F3 of FIG. 1, after the pixel electrode 18 rotates counterclockwise by a first preset angle φ1, the first main electrode 181 is parallel to the polarization direction F1 of the second polarizer 11. The relationship between the first preset angle φ1 and a pitch P of the liquid crystal layer 14 satisfies any one of the first condition, the second condition, the third condition, the fourth condition, or the fifth condition.

The first condition is that: the pitch P of the liquid crystal layer 14 is not greater than 11 µm, and the first preset angle φ1 ranges from 30 degrees to 50 degrees.

The second condition is that: the pitch P of the liquid crystal layer 14 ranges from 11 µm to 13.5 µm, and the first preset angle φ1 ranges from 40 degrees to 60 degrees.

The third condition is that: the pitch P of the liquid crystal layer 14 ranges from 13.5 µm to 16 µm, and the first preset angle φ1 ranges from 45 degrees to 65 degrees.

The fourth condition is that: the pitch P of the liquid crystal layer 14 ranges from 16 micrometers to 18.5 micrometers, and the first preset angle φ1 ranges from 50 degrees to 70 degrees.

The fifth condition is that: the pitch P of the liquid crystal layer 14 is not less than 18.5 µm, and the first preset angle φ1 ranges from 55 degrees to 75 degrees.

Furthermore, an included angle between the first divided electrode 185 and the first main electrode 181 is 45 degrees, and/or the included angle between the second divided electrode 186 and the second main electrode 182 is 45 degrees, and/or the third divided electrode 187 The angle with the third main electrode 183 is 45 degrees, and/or the angle between the fourth sub-electrode 188 and the fourth main electrode 184 is 45 degrees.

Figure 4:
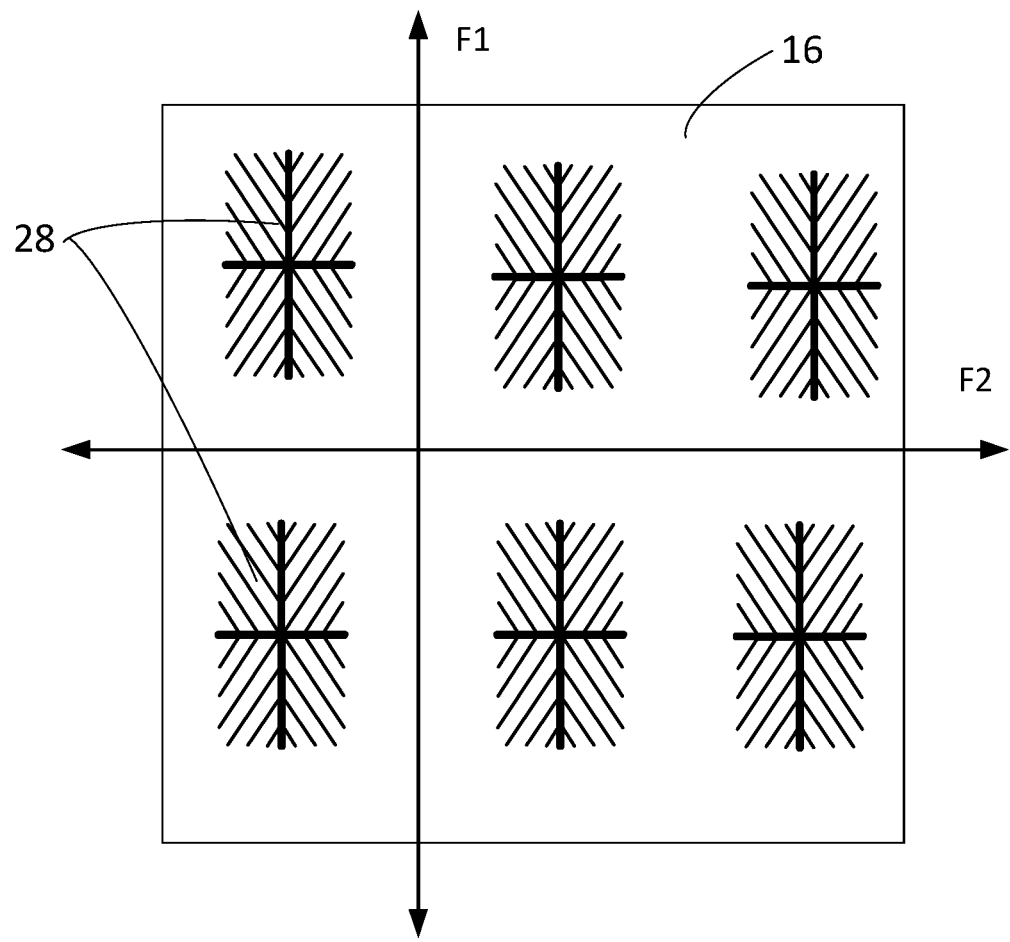
FIG. 4 is a schematic view of the arrangement of the pixel electrodes in another specific embodiment of the display panel of FIG. 1 at a viewing direction from the second substrate to the first substrate.
Figure 5:
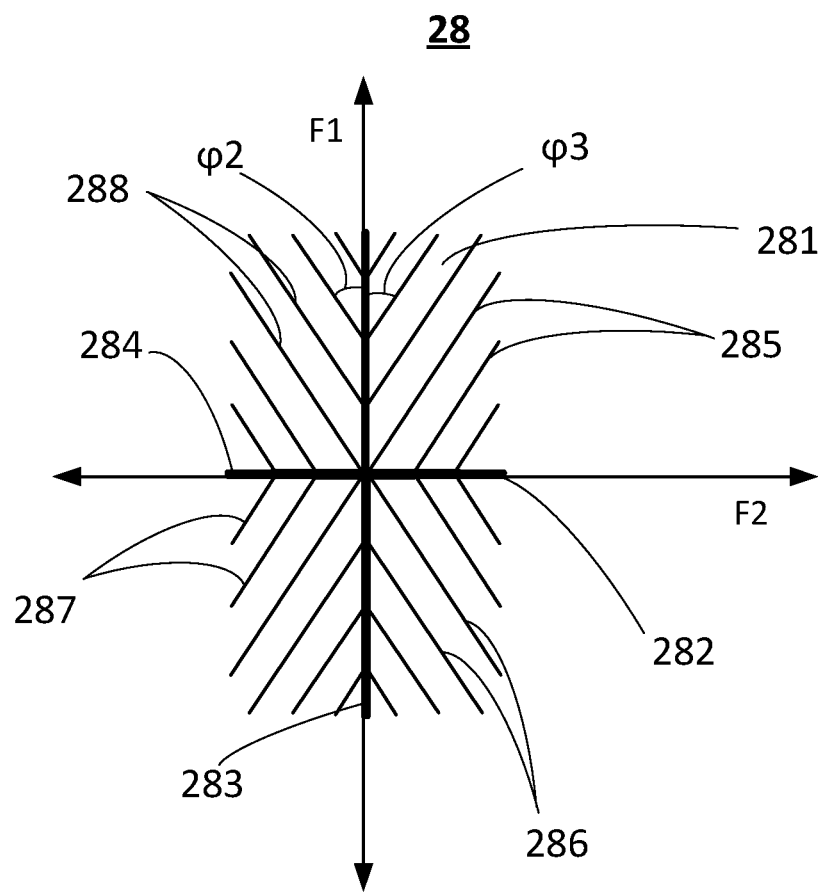
FIG. 5 is a schematic structural view of the pixel electrode in another specific embodiment of the display panel of FIG. 1 at a viewing direction from the second substrate to the first substrate.

Referring to FIGS. 4 and 5, FIG. 4 is a schematic view of the arrangement of the pixel electrodes in another specific embodiment of the display panel of FIG. 1 at a viewing direction from the second substrate to the first substrate. FIG. 5 is a schematic structural view of the pixel electrode in another specific embodiment of the display panel of FIG. 1 at a viewing direction from the second substrate to the first substrate.

In another specific embodiment, a plurality of pixel electrodes 28 are arranged in an array on the first substrate 16. The pixel electrode 28 includes a first main electrode 281, a second main electrode 282, a third main electrode 283, and a fourth main electrode 284 connected at one end. The first main electrode 281, the second main electrode 282, the third main electrode 283, and the first The four main electrodes 284 are arranged clockwise on the first substrate 16 in sequence. Two adjacent main electrodes are perpendicular to each other. A plurality of first sub-electrodes 285 are provided between the first main electrode 281 and the second main electrode 282. A plurality of second sub-electrodes 286 are provided between the second main electrode 282 and the third main electrode 283. A plurality of third sub-electrodes 287 are provided the third main electrode 283 and the fourth main electrode 284. A plurality of fourth sub-electrodes 288 are provided between the fourth main electrode 284 and the first main electrode 281. An end of the first sub-electrode 285 is connected to the first main electrode 281 or the second main electrode 282. An end of the second sub-electrode 286 is connected to the second main electrode 282 or the third main electrode 283. An end of the third sub-electrode 287 is connected to the third main electrode 283 or the fourth main electrode 284. An end of the fourth sub-electrode 288 are connected to the first main electrode 281 or the fourth main electrode 284. The first sub-electrodes 285 are equally spaced from each other. The second sub-electrodes 286 are equally spaced from each other. The third sub-electrodes 287 are equally spaced from each other. The fourth sub-electrodes 288 are equally spaced from each other.

The first main electrode 281 is parallel to the polarization direction F1 of and the second polarizer 11. An angle between the fourth sub-electrode 288 and the first main electrode 281 is the second preset angle φ2. An angle between the first sub-electrode 285 and the first main electrode 281 is the third preset angle φ3. A relationship between the second preset angle φ2, the third preset angle, and the pitch P of the liquid crystal layer 14 satisfies any one of the sixth condition, the seventh condition, the eighth condition, or the ninth condition.

The sixth condition is: a pitch P of the liquid crystal layer 14 is not greater than 13.5 μm. The second preset angle φ2 is 75 degrees to 90 degrees. The third preset angle φ3 is 0 degrees to 15 degrees.

The seventh condition is: the pitch P of the liquid crystal layer 14 is 13.5 μm to 16 μm. The second preset angle φ2 is 70 degrees to 90 degrees. The third preset angle φ3 is 0 degrees to 20 degrees.

The eighth condition is: the pitch P of the liquid crystal layer 14 is 16 μm to 18.5 μm. The second preset angle φ2 is 65 degrees to 90 degrees. The third preset angle φ3 is 5 degrees to 25 degrees.

The ninth condition is that the pitch P of the liquid crystal layer 14 is not less than 18.5 μm. The second preset angle φ2 is 60 degrees to 90 degrees. The third preset angle φ3 is 10 degrees to 30 degrees.

Furthermore, the first sub-electrode 285 is parallel to the third sub-electrode 287. The second sub-electrode 286 is parallel to the fourth sub-electrode 288.

Different from the prior art, the present disclosure provides a display panel including a first substrate and a second substrate disposed opposite each other. A liquid crystal layer is disposed between the first substrate and the second substrate. The liquid crystal layer is doped with a chiral agent. In the present disclosure, the liquid crystal layer of the display panel is doped with a chiral agent and a helical twisting force generated by the chiral agent is used to drive liquid crystal molecules around the pixels to rotate, which can reduce the dark region around the pixel and increase transmittance of the display panel.

The present disclosure also provides a display device including the above display panel 10.

It is be noted that the embodiments of the above-mentioned display panel only describe the above-mentioned structures. Understandably, in addition to the above-mentioned structures, the display panel of the embodiments of the present disclosure may also include any other necessary structures according to the needs, such as a substrate a buffer layer, interlayer dielectric layer (ILD), which are not specifically limited herein.

During specific implementation, the above units or structures can be implemented as independent entities. They can also be combined in any combination and implemented as the same or several entities. For the specific implementation of the above units or structures, please refer to the above-mentioned method embodiments, which are not described in detail herein.

The display panel and display device provided by the embodiments of the present disclosure have been described in detail hereabove and specific examples have been used to explain the principles and embodiments of the present disclosure. The descriptions of the above embodiments are only used for understanding the methods and the principle ideas of the present disclosure. Meanwhile, according to the ideas of the present disclosure, people skilled in the art can carry out changes to the specific embodiments and application scope. In summary, the content of this specification shall not be construed to limit the present disclosure.

The invention claimed is:

1. A display panel, comprising a first substrate and a second substrate disposed opposite each other, a liquid crystal layer is disposed between the first substrate and the second substrate, and the liquid crystal layer is doped with a chiral agent; wherein a pitch of the liquid crystal layer is 8 μm to 60 μm;

wherein the first substrate is an array substrate, the second substrate is a color filter substrate, a first polarizer is disposed on a side of the first substrate away from the liquid crystal layer, a pixel electrode layer is disposed on a side of the first substrate close to the liquid crystal layer, a second polarizer is disposed on a side of the second substrate away from the liquid crystal layer, a polarization direction of the first polarizer is perpendicular to a polarization direction of the second polarizer, and the pixel electrode layer comprises a plurality of pixel electrodes;

wherein the pixel electrode comprises a first main electrode, a second main electrode, a third main electrode, and a fourth main electrode connected at one end, the first main electrode, the second main electrode, the third main electrode, and the fourth main electrode are sequentially arranged clockwise on the first substrate, two adjacent main electrodes are perpendicular to each other, a plurality of first sub-electrodes are provided between the first main electrode and the second main electrode, a plurality of second sub-electrodes are provided between the second main electrode and the third main electrode, a plurality of third sub-electrodes are provided between the third main electrode and the fourth main electrode, and a plurality of fourth sub-electrodes are provided between the fourth main electrode and the first main electrode;

wherein the chiral agent is a levorotatory chiral agent, the first main electrode is parallel to the polarization direction of the second polarizer, an angle between the fourth sub-electrodes and the first main electrode is a second preset angle, an angle between the first sub-electrodes and the first main electrode is a third preset angle, a relationship between the second preset angle, the third preset angle, and the pitch of the liquid crystal layer satisfies any one of a sixth condition, a seventh condition, a eighth condition, and a ninth condition, wherein the sixth condition is: the pitch of the liquid crystal layer is not greater than 13.5 μm, the second preset angle is 75 degrees to 90 degrees, and the third preset angle is 0 degrees to 15 degrees;

the seventh condition is: the pitch of the liquid crystal layer is 13.5 μm to 16 μm, the second preset angle is 70 degrees to 90 degrees, and the third preset angle is 0 degrees to 20 degrees;

the eighth condition is: the pitch of the liquid crystal layer is 16 μm to 18.5 μm, the second preset angle is 65 degrees to 90 degrees, and the third preset angle is 5 degrees to 25 degrees; and the ninth condition is: the pitch of the liquid crystal layer is not less than 18.5 μm, the second preset angle is 60 degrees to 90 degrees, and the third preset angle is 10 degrees to 30 degrees.

2. The display panel of claim 1, wherein a product of the birefringence of the liquid crystal layer and a thickness of the liquid crystal layer is 300 nm to 550 nm.

3. The display panel according to claim 1, wherein the chiral agent is a levorotatory chiral agent, wherein at a viewing direction from the second substrate to the first substrate, the pixel electrode is disposed counterclockwise in a first preset angle, the first main electrode is parallel to the polarization direction of the second polarizer, and a relationship between the first preset angle and the pitch of the liquid crystal layer satisfies any one of a first condition, a second condition, a third condition, a fourth condition, or a fifth condition, wherein the first condition is: the pitch of the liquid crystal layer is not greater than 11 μm and the first preset angle is 30 degrees to 50 degrees;

the second condition is: the pitch of the liquid crystal layer is 11 μm to 13.5 μm and the first preset angle is 40 degrees to 60 degrees;

the third condition is: the pitch of the liquid crystal layer is 13.5 μm to 16 μm and the first preset angle is 45 degrees to 65 degrees;

the fourth condition is: the pitch of the liquid crystal layer is 16 μm to 18.5 μm and the first preset angle is 50 degrees to 70 degrees; and the fifth condition is: the pitch of the liquid crystal layer is not less than 18.5 μm and the first preset angle is 55 degrees to 75 degrees.

4. The display panel according to claim 3, wherein an angle between the first sub-electrodes and the first main electrode is 45 degrees, and/or an angle between the second sub-electrodes and the second main electrode (182) is 45 degrees, and/or an angle between the third sub-electrodes and the third main electrode is 45 degrees, and/or an angle between the fourth sub-electrodes and the fourth main electrode is 45 degrees.

5. The display panel of claim 1, wherein the first sub-electrodes are parallel to the third sub-electrodes and the second sub-electrodes are parallel to the fourth sub-electrodes.

6. A display device, wherein the display device comprises a display panel, the display panel comprises a first substrate and a second substrate disposed opposite each other, a liquid crystal layer is disposed between the first substrate and the second substrate, and the liquid crystal layer is doped with a chiral agent; wherein a pitch of the liquid crystal layer is 8 μm to 60 μm;

wherein the first substrate is an array substrate, the second substrate is a color filter substrate, a first polarizer is disposed on a side of the first substrate away from the liquid crystal layer, a pixel electrode layer is disposed on a side of the first substrate close to the liquid crystal layer, a second polarizer is disposed on a side of the second substrate away from the liquid crystal layer, a polarization direction of the first polarizer is perpendicular to a polarization direction of the second polarizer, and the pixel electrode layer comprises a plurality of pixel electrodes;

wherein the pixel electrode comprises a first main electrode, a second main electrode, a third main electrode, and a fourth main electrode connected at one end, the first main electrode, the second main electrode, the third main electrode, and the fourth main electrode are sequentially arranged clockwise on the first substrate, two adjacent main electrodes are perpendicular to each other, a plurality of first sub-electrodes are provided between the first main electrode and the second main electrode, a plurality of second sub-electrodes are provided between the second main electrode and the third main electrode, a plurality of third sub-electrodes are provided between the third main electrode and the fourth main electrode, and a plurality of fourth sub-electrodes are provided between the fourth main electrode and the first main electrode;

wherein the chiral agent is a levorotatory chiral agent, the first main electrode is parallel to the polarization direction of the second polarizer, an angle between the fourth sub-electrodes and the first main electrode is a second preset angle, an angle between the first sub-electrodes and the first main electrode is a third preset angle, a relationship between the second preset angle, the third preset angle, and the pitch of the liquid crystal layer satisfies any one of a sixth condition, a seventh condition, a eighth condition, and a ninth condition, wherein the sixth condition is: the pitch of the liquid crystal layer is not greater than 13.5 μm, the second preset angle is 75 degrees to 90 degrees, and the third preset angle is 0 degrees to 15 degrees;

the seventh condition is: the pitch of the liquid crystal layer is 13.5 μm to 16 μm, the second preset angle is 70 degrees to 90 degrees, and the third preset angle is 0 degrees to 20 degrees;

the eighth condition is: the pitch of the liquid crystal layer is 16 μm to 18.5 μm, the second preset angle is 65 degrees to 90 degrees, and the third preset angle is 5 degrees to 25 degrees; and the ninth condition is: the pitch of the liquid crystal layer is not less than 18.5 μm, the second preset angle is 60 degrees to 90 degrees, and the third preset angle is 10 degrees to 30 degrees.

7. The display device according to claim 6, wherein a product of the birefringence of the liquid crystal layer and a thickness of the liquid crystal layer is 300 nm to 550 nm.

8. The display device according to claim 6, wherein the chiral agent is a levorotatory chiral agent, wherein at a viewing direction from the second substrate to the first substrate, the pixel electrode is disposed counterclockwise in a first preset angle, the polarization directions of the first main electrode is parallel to the second polarizer, and a relationship between the first preset angle and the pitch of the liquid crystal layer satisfies any one of a first condition, a second condition, a third condition, a fourth condition, or a fifth condition, wherein the first condition is: the pitch of the liquid crystal layer is not greater than 11 μm and the first preset angle is 30 degrees to 50 degrees;

the second condition is: the pitch of the liquid crystal layer is 11 μm to 13.5 μm and the first preset angle is 40 degrees to 60 degrees;

the third condition is: the pitch of the liquid crystal layer is 13.5 μm to 16 μm and the first preset angle is 45 degrees to 65 degrees;

the fourth condition is: the pitch of the liquid crystal layer is 16 μm to 18.5 μm and the first preset angle is 50 degrees to 70 degrees; and the fifth condition is: the pitch of the liquid crystal layer is not less than 18.5 μm and the first preset angle is 55 degrees to 75 degrees.

9. The display device according to claim 8, wherein an angle between the first sub-electrodes and the first main electrode is 45 degrees, and/or an angle between the second sub-electrodes and the second main electrode is 45 degrees, and/or an angle between the third sub-electrodes and the third main electrode is 45 degrees, and/or an angle between the fourth sub-electrodes and the fourth main electrode is 45 degrees.

10. The display device of claim 6, wherein the first sub-electrodes are parallel to the third sub-electrodes and the second sub-electrodes are parallel to the fourth sub-electrodes.

* * * * *